United States Patent Office 3,848,069
Patented Nov. 12, 1974

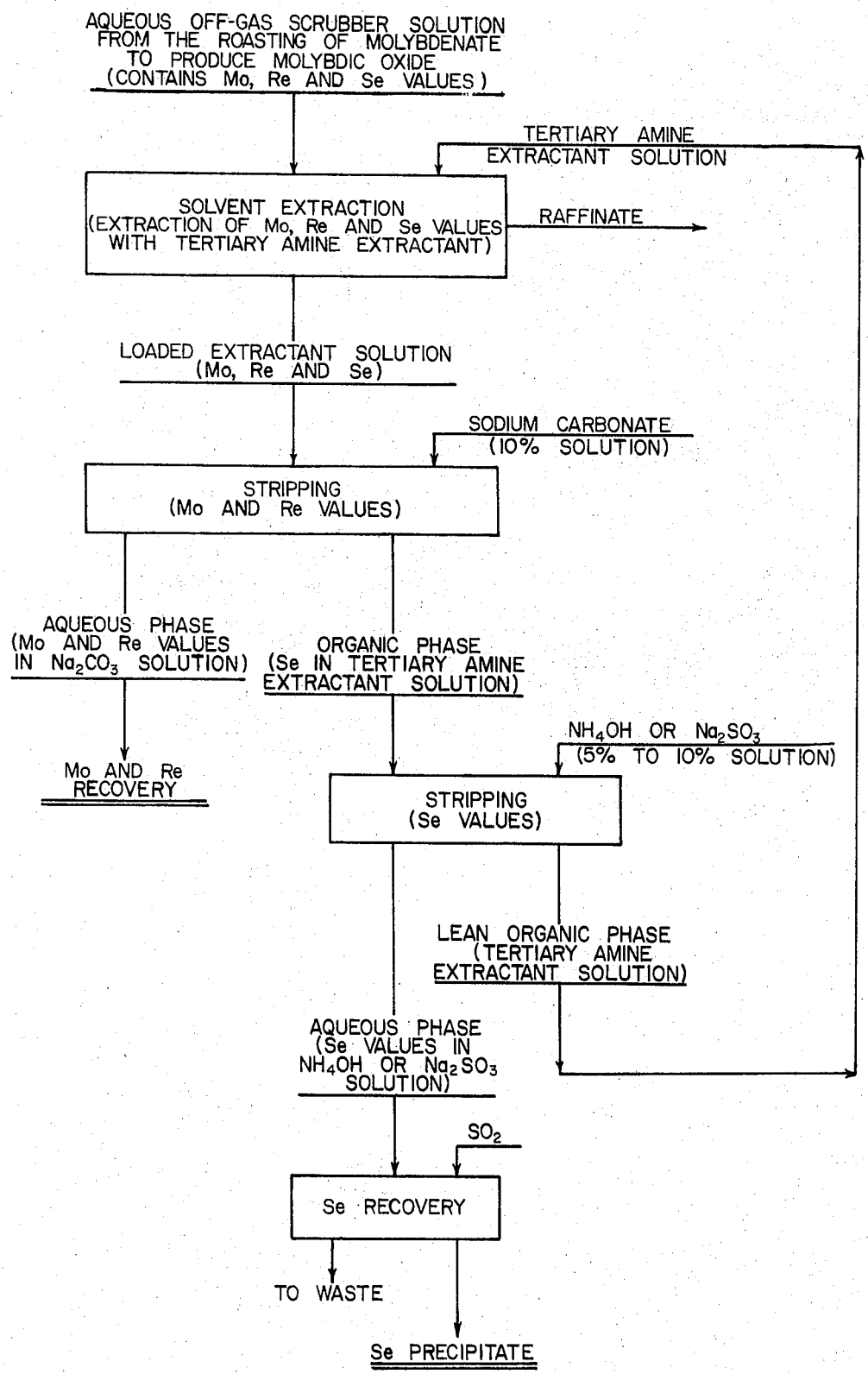

3,848,069
PROCESS FOR RECOVERING SELENIUM VALUES FROM AQUEOUS SOLUTIONS CONTAINING MOLYBDENUM, RHENIUM AND SELENIUM VALUES
Curtis D. Carey and Ronald N. Platzke, Salt Lake City, Utah, assignors to Kennecott Copper Corporation, New York, N.Y.
Filed Nov. 14, 1972, Ser. No. 306,210
Int. Cl. C01b *19/00;* C22b *49/00, 61/00*
U.S. Cl. 423—508                                        6 Claims

ABSTRACT OF THE DISCLOSURE

A process for recovering selenium values from aqueous solutions containing such values, as well as molybdenum and rhenium values, includes, as a first step, subjecting the aqueous solution to liquid-liquid solvent extraction with a tertiary amine to extract the contained molybdenum, rhenium, and selenium values, and, as a second step, stripping the loaded tertiary amine extraction solution with an aqueous solution of sodium carbonate to selectively remove the molybdenum and rhenium values. The tertiary amine extraction solution containing the selenium values is subsequently stripped with an aqueous solution of either ammonium hydroxide or sodium sulfite to remove the selenium values, which can then be recovered by known procedures, such as the injection of $SO_2$ into such stripping solution to precipitate the selenium values.

BACKGROUND OF THE INVENTION

Field

This invention relates to the recovery of selenium values along with other values from gases containing same and to the separation of the selenium values from the other values, particularly molybdenum and rhenium values.

State of the Art

Aqueous, off-gas scrubbing solutions derived from the roasting of molybdenite for the production of molybdic oxide often contain significant amounts of rhenium and selenium values in addition to molybdenum, since rhenium and selenium are found in trace amounts in most molybdenite ores. Each of these metals has great commercial value, and it is therefore economically desirable to recover each value separately from the other. Various solvent extraction and ion exchange techniques are well known in the art for separating rhenium values from molybdenum values and recovering them separately from aqueous solutions. Significant difficulties, however, have been encountered in attempting to separate the selenium values from the rhenium and molybdenum values, in the aforementioned off-gas scrubbing solutions, since the selenium values are soluble in the rhenium solvents customarily employed and have tended to accompany the rhenium values in rhenium recovery processes. Consequently, not only has the rhenium product been undesirably contaminated, but the selenium values have been lost unless further, costly techniques have been utilized to separate the rhenium from the selenium.

SUMMARY OF THE INVENTION

In accordance with the invention, it has become possible to economically separate molybdenum and rhenium values contained in aqueous solutions along with selenium values, from such selenium values and to thereafter recover the selenium values substantially free of the molybdenum and rhenium values. As a first step of the process, the aqueous solution containing the several values (usually derived by the customary scrubbing of off-gases from the roasting of molybdenite to produce molybdic oxide), is subjected to solvent extraction with a tertiary amine solution to remove the molybdenum, rhenium, and selenium values from the aqueous solution. As a second step, the loaded amine organic extractant is then stripped with an aqueous solution of sodium carbonate, preferably between 5% and 10% by weight, to remove the molybdenum and rhenium values. The sodium carbonate stripping solution containing the molybdenum and rhenium values can be and preferably is processed by conventional procedures for separating and recovering the molybdenum and rhenium values therefrom.

The selenium-containing, residual tertiary amine solution is stripped with an aqueous solution of either ammonium hydroxide or sodium sulfite to remove the selenium values from the amine. The selenium values can be recovered from the stripped solution by conventional procedures, such as sulfur dioxide injection, to precipitate the selenium values.

THE DRAWING

The best mode presently contemplated of carrying out the invention is illustrated in the accompanying drawing, in which the single figure is a flow sheet showing the process as applied to an aqueous, off-gas scrubber solution derived from the roasting of molybdenite concentrates containing trace amounts of rhenium and selenium values.

DETAILED DESCRIPTION OF THE ILLUSTRATED PROCEDURES

As illustrated in the accompanying flow sheets, the process of the invention is effectively employed to recover selenium values substantially free of molybdenum and rhenium values contained in aqueous solutions derived by the scrubbing of off-gases from the production of molybdic oxide by roasting molybdenite concentrates.

Certain copper sulfide ores, particularly those found in Bingham Canyon, Utah, contain significant amounts of molybdenite along with trace amounts of rhenium and selenium values. As part of the usual processing of such copper sulfide ores, the molybdenite and the trace values of rhenium and selenium are separated from the copper sulfides as molybdenite concentrates. Such concentrates are customarily treated by roasting to convert the molybdenite to molybdic oxide. The gases driven off during the roasting process contain significant amounts of molybdenum, rhenium, and selenium values. These values are solubilized in aqueous solutions used to scrub the off-gases.

The aqueous, off-gas scrubbing solution is treated for the simultaneous removal of the molybdenum, rhenium, and selenium values by extracting such values therefrom with a tertiary amine extractant. Such extractants are well known in the art. One tertiary amine which performs consistently well is a tri-tri decal amine (13 carbon atoms) manufactured by Ashland Chemical Company under the trademark "Adogen 383." It is preferably mixed with an alcohol containing from 10 to 16 carbon atoms as a third phase inhibitor and with a diluent, such as a petroleum distillate. A preferred tertiary amine extractant is made up of, by volume, 5% Adogen 383 or equivalent, 5% tridecyl alcohol, and 90% Napoelum 470 (tradename for a petroleum distillate manufactured by Kerr-McGee Corporation, Oklahoma City, Oklahoma).

In accordance with the invention, the tertiary amine extractant containing the molybdenum, rhenium, and selenium values is stripped with an aqueous sodium carbonate solution, which removes the molybdenum and rhenium values but leaves the selenium in the organic extractant. It has been found that a 5% to 10% be weight sodium carbonate solution is sufficient to selectively strip substantially all of the molybdenum and rhenium values from the amine extractant, leaving substantially all of the selenium therein.

The molybdenum and rhenium values contained in the aqueous stripping solution can be separated and recovered in accordance with conventional procedures known to the art. For example, the rhenium values can be extracted from the sodium carbonate solution using a quaternary amine extractant, and the thus-loaded organic extractant can be subjected to ammonium thiocyanate stripping for removal of the rhenium values therefrom, which can be recovered by crystallization as ammonium perrhenate. The raffinate remaining from the stripping of rhenium from the extractant contains the molybdenum values, which can be recovered therefrom by known procedures.

The organic tertiary amine extractant remaining after the stripping of molybdenum and rhenium values is further stripped with an aqueous solution of either ammonium hydroxide or sodium sulfite, preferably of approximately 10% by weight strength, to remove the selenium values. The stripped tertiary amine can be recycled to the first step of the process for again extracting molybdenum, rhenium, and selenium values from scrubber solution. The selenium values in the aqueous solution of either ammonium hydroxide or sodium sulfite can be recovered by conventional means, such as by the introduction of sulfur dioxide gas into the solution to precipitate the selenium values.

EXAMPLE I

A tertiary amine extracting solution made up of 5% by volume Adogen 383, 5% by volume tridecyl alcohol, and 90% by volumn Napoleum 470 was used to extract molybdenum, rhenium, and selenium values from an aqueous solution derived by scrubbing the exhaust gases from the roasting of molybdenite to form molybdic oxide. The loaded organic extractant contained 3.8 grams of molybdenum per liter, 0.7 grams of rhenium per liter, and 0.11 grams of selenium per liter, and was contacted at the various volumetric ratios set forth in Table I, below, with a 10% sodium carbonate solution. Contact time in each case was 5 minutes. Both the aqueous and organic phases were sampled for rhenium, molybdenum and selenium. The results are contained in Table I, showing that substantially all of the rhenium and molybdenum were stripped from the organic phase, but that substantially no selenium was stripped.

EXAMPLE II

A similar organic extracting solution, used in the same manner and loaded with 4.10 grams of molybdenum per liter, 0.50 grams of rhenium per liter, and 0.10 grams of selenium per liter, was similarly stripped at the various volumetric ratios set forth in Table II, below, with a 5% sodium carbonate solution. Analysis of samples of both the aqueous and organic phases were as indicated.

TABLE II

| Volume ratio: organic to aqueous | Grams rhenium per liter | | Grams molybdenum per liter | | Grams selenium per liter | |
|---|---|---|---|---|---|---|
| | Organic | Aqueous | Organic | Aqueous | Organic | Aqueous |
| 10/1 | 0.21 | 2.90 | 0.71 | 34.90 | 0.098 | 0.0009 |
| 5/1 | Nil | 2.61 | .58 | 18.20 | .107 | .0005 |
| 1/1 | Nil | .51 | .12 | 4.00 | .102 | .0005 |
| 1/2 | Nil | .26 | .016 | 2.13 | .105 | .0003 |
| 1/5 | Nil | .10 | .020 | .88 | .106 | .000 |

From these data, it appears conclusively that molybdenum and rhenium are effectively separated from the selenium values.

EXAMPLE III

A tertiary amine extractant from a test similar to the foregoing still containing the selenium in amount analyzing 0.515 grams per liter was stripped with a 10% sodium sulfite solution. At the various volumetric ratios set forth in Table III, analyses of samples of the organic raffinate and of the selenium-loaded stripping solution were as indicated (see below). As can be seen, the selenium was stripped almost completely by the sodium sulfite.

TABLE III

| Volume ratio: organic to aqueous | Grams selenium per liter | |
|---|---|---|
| | Organic | Aqueous |
| 10/1 | 0.007 | 7.50 |
| 5/1 | .0008 | 3.70 |
| 1/1 | .002 | .67 |
| 1/2 | .0003 | .28 |
| 1/5 | .003 | .09 |

Whereas this invention is here illustrated and described with particular reference to the best mode presently contemplated of carrying it out, it should be realized that other modes are possible without departing from the inventive concepts.

What is claimed is:
1. A process for recovering selenium values from an aqueous solution containing selenium, molybdenum, and rhenium values, comprising the steps of:
(a) Intimately contacting such an aqueous solution with a tertiary amine extractant solution to extract the selenium, molybdenum, and rhenium therefrom;
(b) Contacting the tertiary amine solution from step (a) with an aqueous solution containing an effective amount of sodium carbonate to selectively strip the molybdenum and rhenium values therefrom;
(c) Thereafter, contacting the stripped tertiary amine solution from step (b) with an aqueous stripping

TABLE I

| Volume ratio: organic to aqueous | Grams rhenium per liter | | Grams molybdenum per liter | | Grams selenium per liter | |
|---|---|---|---|---|---|---|
| | Organic | Aqueous | Organic | Aqueous | Organic | Aqueous |
| 10/1 | 0.042 | 6.98 | 0.19 | 38.80 | 0.11 | 0.017 |
| 5/1 | .002 | 3.18 | .18 | 19.00 | .12 | .015 |
| 1/1 | .002 | .69 | .11 | 3.80 | .11 | .008 |
| 1/2 | .002 | .35 | .05 | 1.90 | .10 | .005 |
| 1/5 | Nil | .14 | .01 | .75 | .11 | .002 | solution of ammonium hydroxide or sodium sulfite to strip the selenium values therefrom; and (d) Recovering the selenium values from the aqueous stripping solution from step (c).

2. A process as set forth in Claim 1, wherein the aqueous solution containing selenium, molybdenum, and rhenium values is derived by scrubbing the exhaust gases from the roasting of molybdenite to produce molybdic oxide.

3. A process as set forth in Claim 1, wherein the extractant solution in step (a) comprises by volume about 5% tertiary amine, about 5% alcohol of from 10 to 16 carbon atoms, and about 90% petroleum distillate.

4. A process as set forth in Claim 1, wherein the aqueous solution of sodium carbonate has a sodium carbonate concentration of between about 5% and about 10%.

5. A process as set forth in Claim 1, wherein the aqueous stripping solution in step (c) has an ammonium hydroxide or sodium sulfite concentration of about 10%.

6. A process as set forth in Claim 1, wherein the selenium values are recovered from the aqueous stripping solution from step (c) by contacting said solution with sulfur dioxide gas to precipitate the selenium values.

References Cited

UNITED STATES PATENTS

| | | | |
|---|---|---|---|
| 3,458,277 | 7/1969 | Platzke et al. | 423—49 |
| 3,455,677 | 7/1969 | Litz | 423—54 |
| 3,723,595 | 3/1973 | Spedden | 423—49 X |
| 3,681,016 | 8/1972 | Litz | 423—50 X |

OTHER REFERENCES

Zaitsev et al., Chemical Abstracts, Vol 64, #13452d (1966).

OSCAR R. VERTIZ, Primary Examiner

B. E. HEARN, Assistant Examiner

U.S. Cl. X.R.

423—49, 54; 75—101 BE